United States Patent [19]

MacTurk

[11] 4,191,604
[45] Mar. 4, 1980

[54] METHOD OF CONSTRUCTING THREE-DIMENSIONALLY CURVED, KNIT WIRE REFLECTOR

[75] Inventor: William L. MacTurk, Upland, Calif.

[73] Assignee: General Dynamics Corporation Pomona Division, Pomona, Calif.

[21] Appl. No.: 899,689

[22] Filed: Apr. 24, 1978

Related U.S. Application Data

[60] Continuation-in-part of Ser. No. 647,015, Jan. 7, 1976, abandoned, which is a division of Ser. No. 591,794, Jun. 30, 1975, abandoned.

[51] Int. Cl.$^2$ .............................................. B29G 5/00
[52] U.S. Cl. .................................. 156/245; 343/897; 343/912
[58] Field of Search ...................... 156/242, 245, 148; 343/897, 912

[56] References Cited

U.S. PATENT DOCUMENTS

| | | | |
|---|---|---|---|
| 1,962,041 | 6/1934 | Spony | 343/897 |
| 2,945,233 | 7/1960 | Wild et al. | 343/912 |
| 2,948,896 | 8/1960 | Hart | 343/873 |
| 3,150,030 | 9/1964 | Mondam | 343/912 |
| 3,536,800 | 10/1970 | Hubbard | 343/912 |

*Primary Examiner*—Caleb Weston
*Attorney, Agent, or Firm*—Henry M. Bissell; Edward B. Johnson

[57] ABSTRACT

An electrically conducting, electromagnetic wave reflector comprises a knit wire reflecting surface consisting of two superimposed knitted wire meshes. The wire mesh reflector is impregnated with a transparent thermo-setting resin so that the metallic structure is no more than 3 mils from the outer surface of the reflector. The knitted wire mesh permits the fabric to be smoothly stretched over a three-dimensional surface of predetermined shape. The two wire meshes are staggered with respect to each other to reduce the effective size of the openings between the loops of the mesh. A reinforcing structure preferably consisting of two layers of glass cloth impregnated with a thermo-setting resin is utilized to provide a lightweight reflector substantially impervious to environmental corrosion. The resulting structure may be used as an antenna or reflector and is suitable for the microwave region such as the K band. There is also disclosed a method of constructing such a reflector.

13 Claims, 8 Drawing Figures

METHOD OF CONSTRUCTING THREE-DIMENSIONALLY CURVED, KNIT WIRE REFLECTOR

CROSS-REFERENCE TO RELATED APPLICATIONS

The present application is a continuation-in-part of the copending application Ser. No. 647,015 filed on Jan. 7, 1976 which in turn is a division of the parent application Ser. No. 591,794, filed on June 30, 1975, both now abandoned, both being assigned to the assignee of the present application.

BACKGROUND OF THE INVENTION

1. Field of the Invention.

The present invention relates generally to electromagnetic wave reflectors having a three-dimensionally curved reflecting surface, and particularly relates to a structure of this type where the reflecting surface is formed by a pair of open mesh conductors.

2. Description of the Prior Art.

Electromagnetic wave reflectors such as for example parabolic radar antennas require electrically conducting surfaces which closely conform to mathematically calculated shapes. Deviation of the reflecting surface from the calculated three-dimensional surface causes loss of power and loss of information. Desirably the reflecting surface forms an optical finish which may be defined as a surface which deviates no more than 5 microinches RMS (root mean square) from the calculated surface.

Conventionally such reflecting surfaces for antennas, reflectors and the like are manufactured by machining, spinning, stretch forming or vacuum plating of metals on plastic members. Generally such antennas are expensive and usually require much tooling and labor. In addition reflectors which are machine spun or stretch-formed may be too heavy for use in aircraft or other applications requiring lightweight reflectors. This is also true of radar antennas such as search antennas which must be mechanically moved. Another problem is that the reflecting surface is exposed and subject to physical damage. When they are used on ships they are subjected to corrosion by sea water spray and the like.

To overcome some of these problems electromagnetic wave reflectors have been proposed which employ thin woven wire or metal strip surfaces. The metal may be laminated within a lightweight reinforcing plastic support. It is well known that if the mesh size is appreciatively less than the length of the electromagnetic waves to be reflected, the porous surface reflects as if it were continuous. Examples of such reflector structures are disclosed in the patents to Wild et al U.S. Pat. No. 2,945,233, Mondano U.S. Pat. No. 3,150,030 and Hart, Jr. U.S. Pat. No. 2,948,896. According to the Hart, Jr. patent however, the conductive wire screen is covered on both surfaces with fiberglass cloth layers. Therefore the conductive screen is relatively far away from the outer surface and its shape cannot be controlled as precisely as may be necessary.

According to these patents the woven wire metal strip and the fiberglass reinforced plastic resins are formed over molds having the predetermined convex surfaces. Sometimes vacuum techniques are employed to force laminations against the surface of the mold. Comparatively lightweight electromagnetic wave reflectors having protective reflecting surfaces may thereby be formed. However, the exact shape of the reflecting surface is difficult to control in this manner.

A major problem associated with the use of woven wire or metal strips for the reflecting surface is that the woven materials cannot be made to smoothly conform to a three-dimensionally curved surface. Woven materials stretch only diagonally and tend to wrinkle, bulge or fold back on themselves when stretched over three-dimensionally curved surfaces. The resulting surface irregulatiries cause power loss and may result in lost information. This tendency to cause surface irregularities is enhanced by the laminations of the reflecting material between layers of still soft reinforcing resins. Further it will be realized that vacuum forming equipment increases the price of such antennas.

Reference is also made to a patent to Spong U.S. Pat. No. 1,962,041. This patent proposes to utilize a tubular length of mesh to be used as an antenna or earth. The antenna actually consists of suitable wire of copper or phosphor-bronze which is knit in the form of a stocking to provide a tubular structure. However, the patent does not disclose any manner in which such an antenna may be protected from environmental influences and contaminations nor does the patent disclose that such an antenna may be formed into a three-dimensional surface of predetermined contour.

The patent to Hubbard U.S. Pat. No. 3,536,800 is also noted. According to this patent a thin metallic layer of film is laid upon a mold. A thick plastic support layer is laid over the metal film. The metal film is made by spraying fine particles of metal onto the mold surface.

SUMMARY OF THE INVENTION

In accordance with the present invention there is provided a method of constructing an electromagnetic wave reflecting structure such as an antenna suitable for the microwave frequency range. The reflector comprises an electromagnetic wave reflecting member. This reflecting member consists of two electrical conductive layers, each formed of a plurality of non-closed loops of interconnected wires forming a knit. The non-closed loops of the layers are overlapped to form apertures therebetween. The two conductive layers are so disposed over each other that the effective aperture size is appreciatively reduced. The conductive layers due to their construction are stretchable in any direction as a finished knit and hence are formed into a smooth, continuous, three-dimensional surface of predetermined shape. Thus, for example, the reflecting member may form a paraboloid such as is conventional for a radar reflector antenna.

A transparent thermo-setting material such as a resin is worked into the strands of the two conductive layers so as to envelope them and protect them against the environment and corrosive influences. Support means are further provided for maintaining the reflecting member rigidly in its contour. Preferably the support includes two layers of glass cloth which are also impregnated with a thermo-setting material such as a resin. This resin will rigidly bind the support to the reflecting member and its coating.

A copending application to the applicant assigned to the assignee of the present invention and filed concurrently herewith, Ser. No. 899,690 claims the reflector.

The novel features that are considered characteristics of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
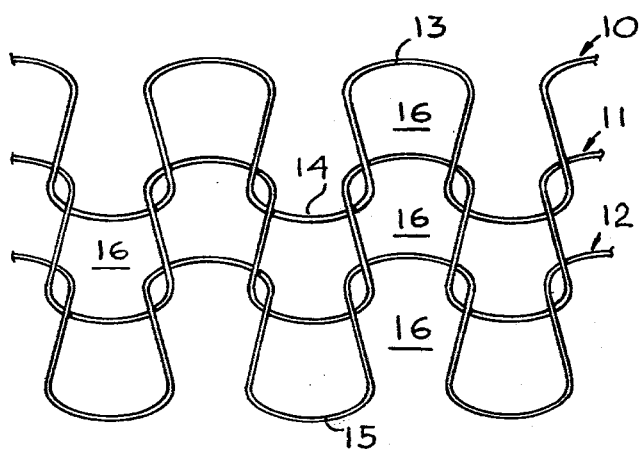
FIG. 1 is a plan view on enlarged scale showing a knitted and stretchable wire mesh fabric forming the basis for the reflector of the invention.

Referring now to the drawings and particularly to FIG. 1, there is illustrated an electrically conductive layer of open mesh fabric which is utilized in accordance with the present invention for the reflector. A plurality of relatively thin, non-insulated wires 10, 11 and 12 are knitted together to form non-closed loops such as 13, 14 and 15. Thus the lower portion of loop 13 of wire 10 passes through the upper portion of loop 14 of wire 11 etc. Open spaces or apertures 16 are formed between the loops 13 to 15. The meshes may be distorted by stretching the resulting fabric in any direction without tearing or wrinkling. It should be noted that a woven fabric is stretchable only in a diagonal direction and hence cannot be formed in the shape of a three-dimensional surface without wrinkling. Such a knit wire fabric is obtainable from CAL-METEX Corporation of Inglewood, California.

Figure 2:
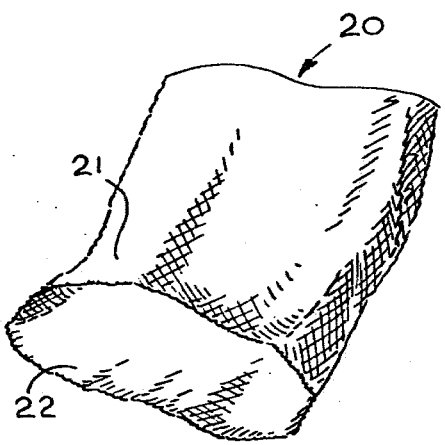
FIG. 2 is a view in perspective illustrating a tubular stocking-like knitted wire mesh utilized for the reflector of the invention.

As illustrated in FIG. 2, such a knitted wire mesh 20 is readily available as a tubular stocking which can be formed by pressing it into two superposed layers 21 and 22. By way of example, the knit may consist of 5 mil brass wire silverplated with 0.070 inch apertures or meshes 16. Preferably, the knitted wire mesh has 14 courses per inch. This is simply the number of wires per inch along the length of the mesh. The openings per inch are the number of openings per inch across the width of the mesh. These vary somewhat with the mesh style but usually the openings are between 1.4 and 1.8 times the courses per inch.

As indicated before in accordance with the present invention the reflector is preferably built up of two superimposed layers of the knit wire mesh such as shown in FIG. 2. This in turn makes it possible that the effective aperture size may be reduced from 0.070 inch for one layer of knit wire mesh to approximately 0.045 inch to 0.055 inch.

In order for the reflector consisting of an open or apertured structure to act as a smooth continuous reflector of electromagnetic waves, it is necessary that the size of the openings be much smaller than the wavelength of electromagnetic waves. Preferably the wavelength should be 16 times the effective aperture size. Hence for an effective aperture size of between 0.045 and 0.555 inches a frequency between 16.6 and 13.4 gigahertz (GHz) may be used. This in turn corresponds to the microwave frequency range and specifically to the K band extending from 11 to 36 GHz. For higher frequencies additional, further overlapped, layers of knitted wire mesh may be added to further reduce the effective aperture size.

Figure 3:
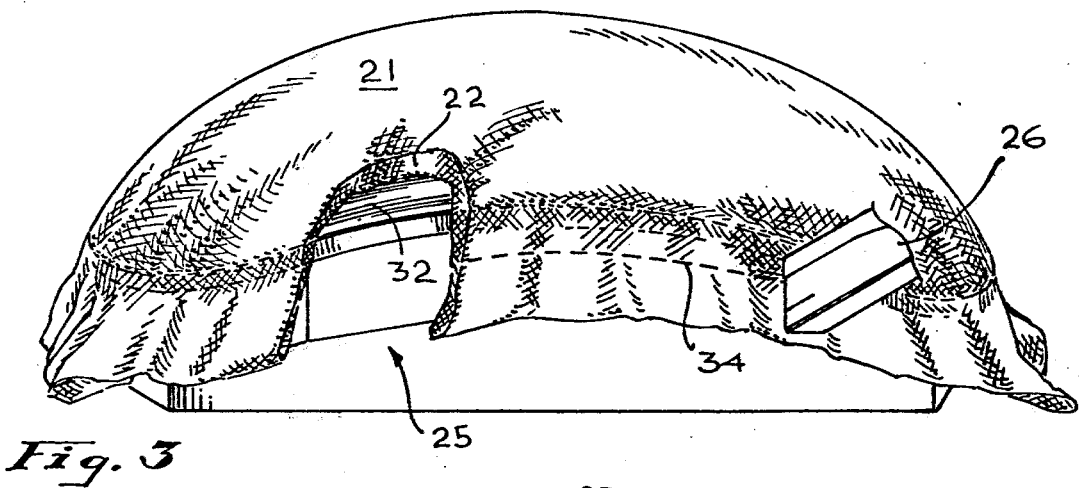
FIG. 3 is a view in perspective of the mold showing a double layer of knitted wire screen being laid over the front face of the mold and stapled thereto.

The two knitted wire meshes 21 and 22 are now stretched over a suitable mold 25 shown in FIG. 3. They are preferably staggered with respect to each other to reduce the effective aperture size. After each of the two knitted wire meshes 21 and 22 have been properly stretched into position they are secured to the mold 25, for example, by a stapler 26.

Preferably the top layer 21 of the knit wire mesh is stretched say about 50% greater than the bottom layer before it is stapled into place. This will assure that the apertures of the two layers 21 and 22 are staggered with respect to each other thereby to reduce the effective aperture size.

The mold 25 is made in such a manner that its surface forms an optical surface finish. This may be defined so that the deviations from the ideal mathematical surface are no more than 5 microinches RMS (root mean square). How this is accomplished will be explained hereinafter in connection with an explanation of the method of manufacturing the entire antenna.

Figure 4:
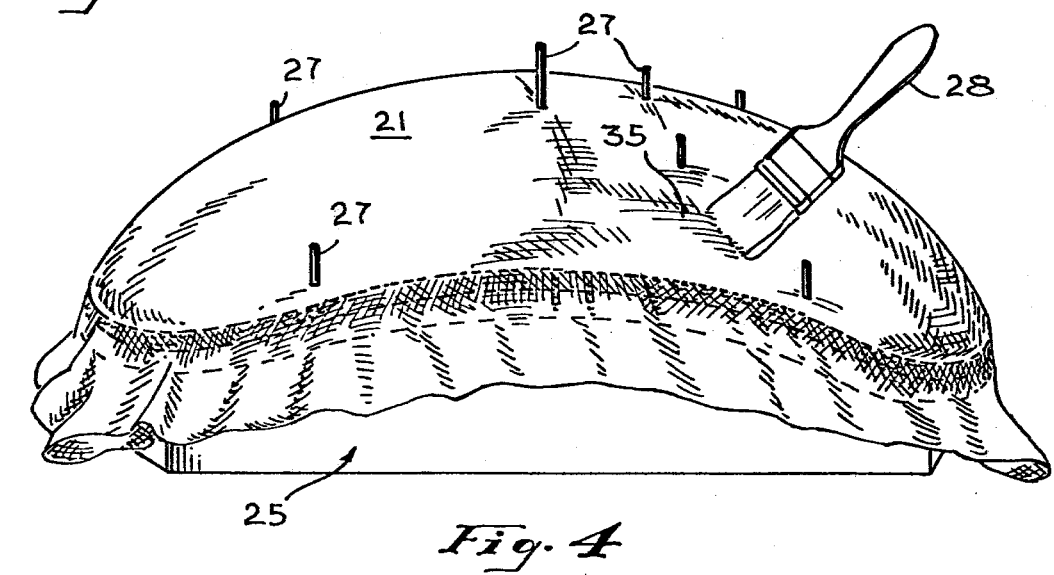
FIG. 4 is a view similar to that of FIG. 3 showing a coat of a thermo-setting resin such as a clear polyester being brushed over and into the wire screen, and also illustrating locating pins put in place over the double wire screen.

FIG. 4 to which reference is now made shows the next step in the manufacture of the reflector. A plurality of dowel pins 27 are now inserted through the wire mesh by pushing, if necessary, the wire loops aside. The pins 27 are pushed into the mold 25 to provide various tooling holes for registration purposes. These serve the purpose to secure subsequently the steel guy wires and turnbuckles which secure the waveguide feed and also to mount the receiver to the back surface of the finished antenna.

At this stage a thermo-setting material is brushed by the brush 28 into the knit wire structure. By way of example, the thermo-setting material may consist of a clear polyester or epoxy. This makes it possible to visually check the wire mesh to make sure that it is tightly stretched without wrinkles and that the effective aperture size is made as small as possible. The thermo-setting polyester may require a suitable catalyzer to permit it to polymerize. It is important that the resin is carefully brushed in by the brush 28 so that all wire apertures 16 are filled with resin and that the resin completely surrounds each loop of the wire mesh. This in turn will protect the finished reflector from atmospheric influences, corrosion and the like.

Figure 5:
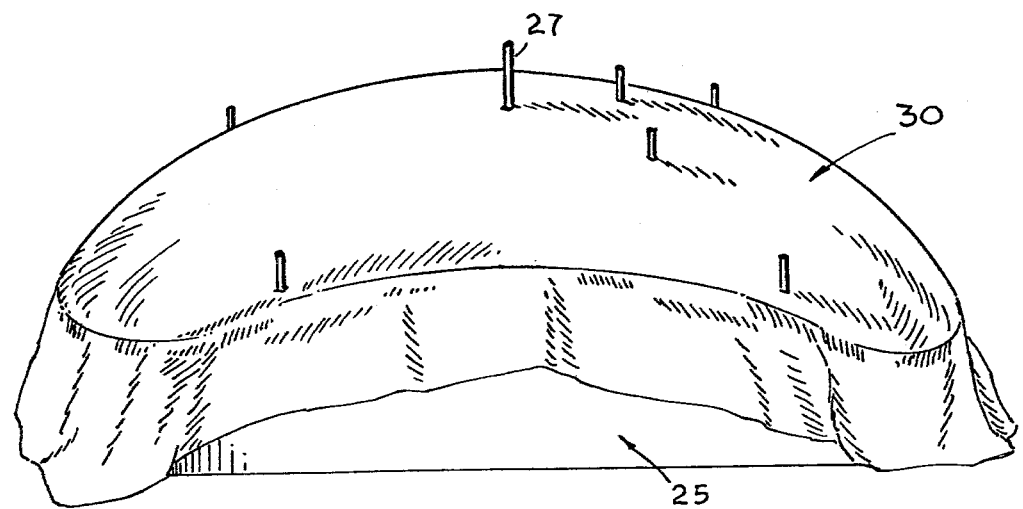
FIG. 5 is a view in perspective similar to that of FIG. 4 and depicts two layers of a glass cloth being laid over the front face of the wire screen of FIG. 4 before being coated with a thermo-setting resin.

FIG. 5 shows the next step in the process of manufacturing the antenna. One or two layers 30 of glass cloth are stretched over the structure of FIG. 4. Preferably the glass cloth is impregnated with resin in the manner previously described in connection with FIG. 4. The polyester resin will create a tight bond between the knit wire mesh and the one or two layers of glass cloth. One layer of glass cloth is wet with resin before the next layer of glass cloth is applied and wet with resin. Excess resin is then removed with Teflon and steel hand rollers. It should be understood that the resin coating is absorbed in the glass layers and bonded to the resined knit wire surface, and cannot subsequently be observed as a separate layer. It will be understood that the glass cloth is carefully put over the pins 27. The pins may be waxed to facilitate their subsequent removal. They in turn provide registration for a plurality of structures which are secured to the complete antenna structure. It should also be noted that the glass cloth 30 is a knitted cloth. Therefore it also has enough stretch to conform to the surface or contour of the mold.

It should be noted that the polyester or thermosetting resin has the advantage that it cures or polymerizes at room temperature.

Figure 6:
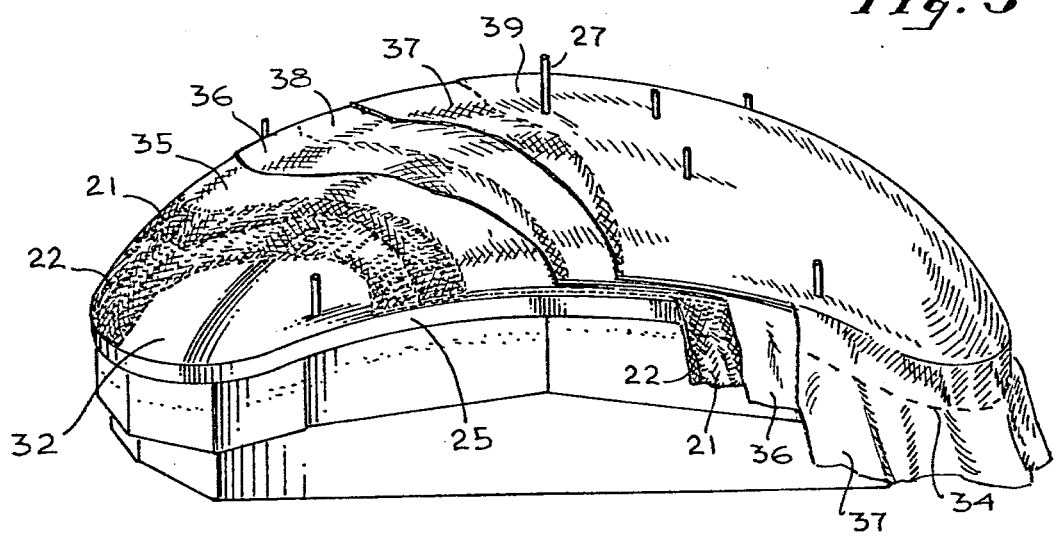
FIG. 6 is a view in perspective partly broken away showing the partially finished reflector with the various layers of which it is comprised.

The finished reflector structure still secured to its mold is shown in FIG. 6. The mold 25 has an optically smooth surface 32. Knitted wire mesh sheets 22 and 21 are put over the surface 32 of the mold 25. Staples 34 are also shown in FIG. 6 which secure the sheets of wire mesh 21 and 22 to the mold 25. The thin coat 35 of resin which appears over the wire mesh 21 is also illustrated. The first layer of glass fiber cloth is shown at 36 with a thin layer of polyester resin 38. A second layer 37 of glass fiber cloth is also illustrated with its thin coat 39 of polyester resin. These coats are applied in the manner previously explained.

When the resin has cured sufficiently it can be trimmed when the material hanging over the mold is stiff but still slightly tacky. The trimming may be effected with a so-called box knife which is a knife with a triangular outline and angled blade. It is important that the fiber cloth be trimmed in time before the resin gets too hard but after it has become relatively stiff.

The mold 25 may, for example, consist of laminated hardwood having an upper surface of the desired contour of the reflector or antenna. Alternatively, the mold 25 may also be machined from aluminum which is preferred. The mold is then highly buffed and polished to give an optical surface. The aluminum mold has wooden sides to allow the knitted wire mesh to be stapled thereon. The surface is coated with a gel which is highly polished and layered over a fiberglass resin matrix. This in turn will provide the desired optical surface finish.

It will be understood that normally two layers of glass cloth are sufficient. However for special applications additional reinforcing layers may be used as desired.

When made in the manner above explained, the wire mesh is approximately between two and three mils from the front or outer surface of the antenna. It will be realized that in this manner the actual reflecting surface conforms very closely to the theoretical surface which is the desired surface. This in turn will greatly reduce radar signal losses and loss of information. This distinguishes the reflector of the present invention from those of the prior art. Another feature of the reflector of the invention is that the structure illustrated in FIG. 6 only weights approximately three pounds. Furthermore, because the two layers of knitted wire mesh 21 and 22 are each entirely surrounded by the thermo-setting resin, they are effectively protected from the environment and any corrosive materials to which the reflector may be exposed.

It will also be realized that the reflector of the invention need not necessarily be a parabolic shape. It is equally possible to build a sphere constructed from two separate hemispheres using the wire mesh in the manner explained herein. Such reflecting spheres may, for example, be used as radar targets both in the air and at sea. For the reasons explained they are also impervious to corrosion as well as deterioration due to ultraviolet sunlight.

It may also be noted that the mold 25 may be coated at its surface with a suitable release wax to facilitate removal of the finished reflector as shown in FIG. 6.

Figure 7:
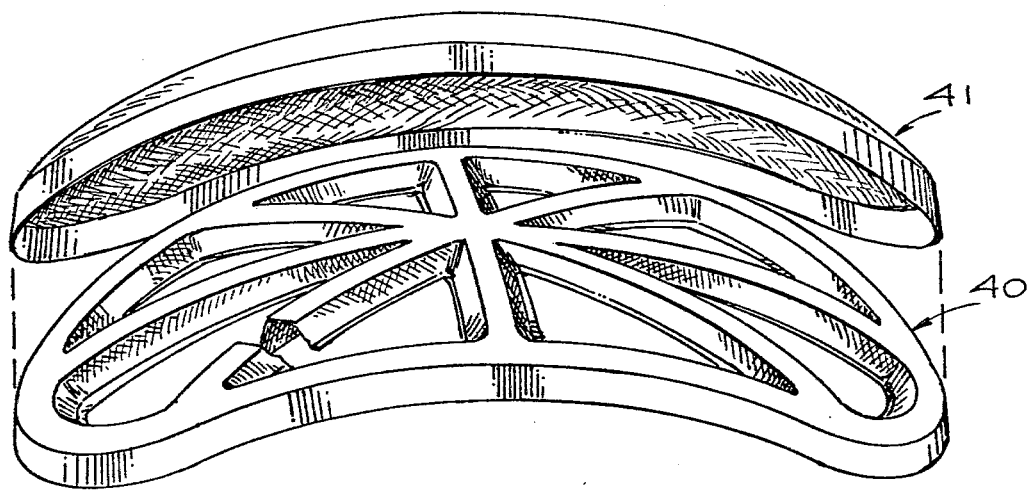
FIG. 7 is a view in perspective of a rib structure after its removal from its rib mold utilized as a pre-molded back surface for the reflector of the invention.

In order to mount the antenna of the invention, a suitable reinforcing structure is needed which must be secured thereto. This may be effected with the rib structure 40 illustrated in FIG. 7. The rib structure again is made from a suitable mold. A light coat of chopped glass cloth is applied in the manner previously described. The resulting structure is shown in FIG. 7 after it has been removed from its mold. This rib structure 40 is then applied to the pre-molded back surface 41 and bonded to it with resin. This structure including the bosses is then molded to the rear and side surface of the antenna with resin before the completed antenna is removed from the mold 25 (FIGS. 5 and 6).

Figure 8:
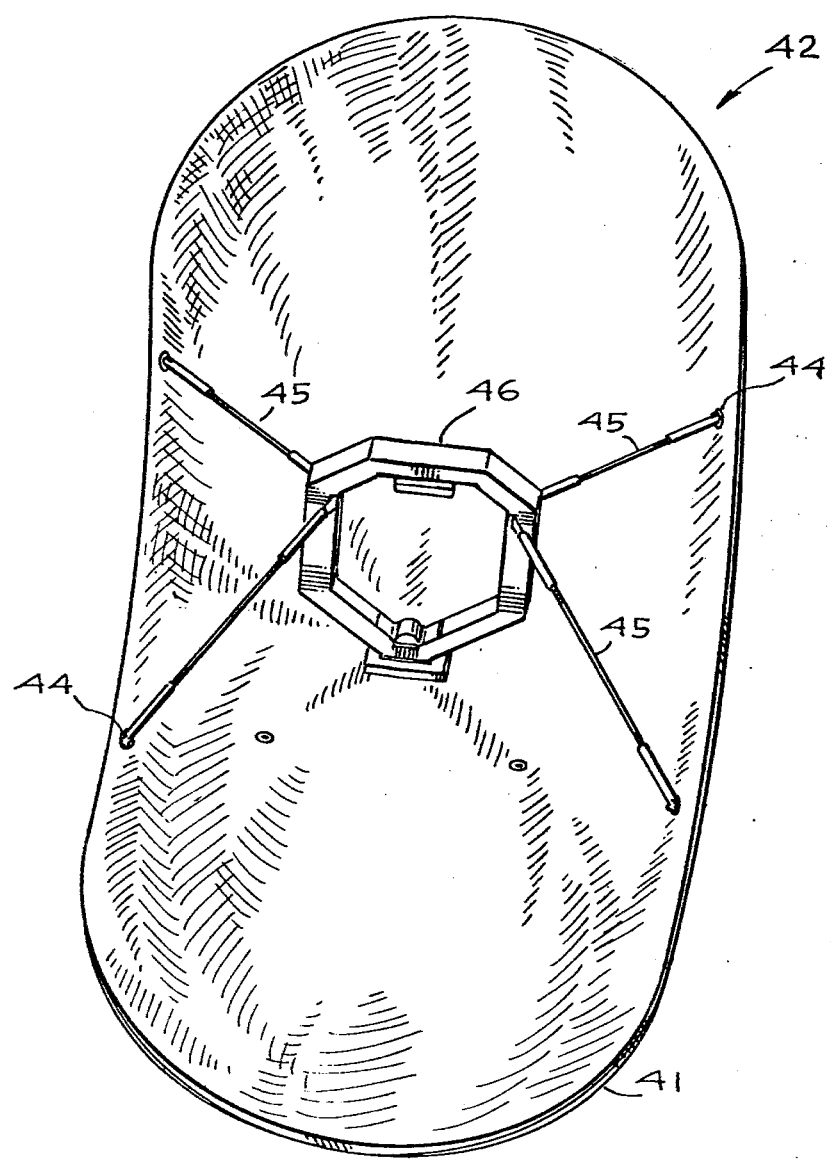
FIG. 8 is a view in perspective of the outer surface of the completed reflector showing a horn, a waveguide feed and its harness.

The completed antenna is illustrated in FIG. 8. The total weight of the antenna 42 of FIG. 8 is about 18 lbs. which includes the supporting rib structure 40 and back surface 41 of FIG. 7. The pins 27 which are removed for the complete antenna provide registration for a plurality of bosses which are bonded into the antenna structure of FIG. 8. After the pins are pulled out, suitable holes may be drilled from the front through the solid bosses and back surface for anchoring the guy wire and turnbuckle assembly 45 and the receiver to the back of the antenna. A polyester putty may be used for the turnbuckle bosses clearly shown at 44 in FIG. 8. A threaded insert may be inserted into the holes for the bosses 44. They in turn secure a guy wire and turnbuckle assembly 45 which supports a horn and waveguide feed element 46 for transmitting or receiving the electromagnetic energy reflected by the antenna 42.

There has thus been disclosed a method of manufacturing a lightweight reflector antenna. Two layers of knit wire mesh are stretched over the surface of the mold having an optical finish. The first layer is stapled to the mold and a second layer is stretched tightly over the mold and staggered relative to the first layer so that the effective apertures provided between the loops of the two knit wire meshes are appreciably smaller than the actual apertures of each wire mesh. Thereafter a plurality of registration or location pins are pushed through the wire mesh into the mold. A thermo-setting resin is brushed over the stretched wire mesh in such a manner that the wire of the structure is entirely surrounded by the resin. This will of course minimize any corrosion problems due to environmental influences. Subsequently two layers of glass cloth are put over the wire mesh, each of the glass cloth layers being treated in the same manner. Finally, a reinforcing rib structure is manufactured in a similar manner and secured to the underside of the finished antenna. The pins may be removed at that stage and the holes remaining serve to locate and fasten the harness which may be used to secure the horn and its waveguide.

Although there have been described above specific examples of a method of constructing a three-dimensionally curved, knit wire reflector in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A method of constructing a three-dimensionally contoured, electromagnetic reflecting structure by means of first and second sheets of electric conductors, each consisting of flexible open loop knit mesh fabric, said method comprising the steps of:

constructing a mold having a three-dimensionally curved surface of desired shape;

stretching a first conductor forming a sheet of the knit mesh fabric smoothly and continuously over the curved surface of the mold;

securing edge portions of the first conductor to maintain the sheet in a stretched condition over the mold;

stretching a second conductor forming the second sheet of said knit mesh fabric over the curved surface of the mold, said second conductor being stretched approximately 50% greater so that the apertures formed between the loops of the two conductors are staggered with respect to each other to form a series of effective apertures of substantially smaller size than the apertures of either sheet, said effective apertures being less than 1/16 the wavelength of electromagnetic radiation in the range of intended use of the reflecting structure;

applying a thin coating of a thermo-setting resin into and over the meshes of said two conductors in such a manner that substantially the entire mesh fabric of said two conductors is covered by the resin;

applying at least one layer of knitted glass cloth over the coated electrical conductors; and applying a thin coating of thermo-setting resin over the layer of glass cloth.

2. The method defined in claim 1 wherein a second layer of glass cloth is applied over the first layer of knitted glass cloth and wherein both layers of glass cloth are coated with a thermo-setting resin.

3. The method defined in claim 1 wherein said thermo-setting resin consists of a polyester resin.

4. The method defined in claim 1 wherein said thermo-setting resin consists of an epoxy resin.

5. The method defined in claim 1 wherein after said two conductor sheets are stretched over the mold, a plurality of removable dowel pins are inserted at predetermined positions into the surface of the mold and through the conductor sheets to provide registration with bosses mounted in mating portions to be attached to the reflecting structure.

6. The method defined in claim 1 wherein said thermo-setting resin is worked into said conductors by brushing the resin over and between said conductors.

7. The method defined in claim 1 wherein the edges of the excess material of the layers of glass cloth and of the conductors are trimmed off when the thermo-setting resin is stiff but still slightly tacky.

8. The method defined in claim 1 wherein a reinforcing rib structure consisting of chopped glass cloth is molded and subsequently secured to the back surface of the completed reflecting structure.

9. The method defined in claim 1 further comprising the step of stretching additional conductors forming additional sheets of the knit mesh fabric over the second conductor sheet, said additional conductors being stretched and overlapped with the first and second sheets to further reduce the effective aperture size relative to the effective aperture size provided by the first and second sheets.

10. The method defined in claim 5 further comprising the steps of removing the dowel pins after the reflecting structure is finished, leaving tooling holes where the pins had been; affixing to the back of the reflecting structure a reinforcing rib structure having a plurality of bosses bonded therein in registration with the dowel pin tooling holes; and drilling and threading the bosses through the tooling holes to secure a harness and electromagnetic receiving/transmitting structure onto the front of the finished reflecting structure.

11. The method defined in claim 10 further comprising the step of affixing a pre-molded back surface to the back of the rib structure to complete an antenna comprising the reflecting structure, reinforcing rib structure and back surface.

12. The method defined in claim 1 wherein for a reflecting structure to be used with electromagnetic radiation in the microwave frequency range between 16.6 and 13.4 GHz, the knitted aperture size of the first and second sheets is 0.070 inch and the sheets are staggered to develop an effective aperture size of approximately 0.045 inch to 0.055 inch.

13. The method defined in claim 12 wherein the first and second sheets are opposite sides of a knit wire mesh tube folded flat.

* * * * *